(12) United States Patent
Ladd

(10) Patent No.: US 6,189,139 B1
(45) Date of Patent: *Feb. 13, 2001

(54) INF DEVELOPMENT ENVIRONMENT

(75) Inventor: Patrick G. Ladd, San Marcos, CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/988,044

(22) Filed: Dec. 10, 1997

(51) Int. Cl.[7] .................................................. G06F 9/445
(52) U.S. Cl. ........................ 717/4; 717/1; 717/3; 717/11
(58) Field of Search ................................ 395/703, 704, 395/705; 717/1, 2, 3, 4, 5, 6

(56) References Cited

U.S. PATENT DOCUMENTS

| 4,891,773 | * | 1/1990 | Ooe et al. ............................ 364/578 |
| 5,544,348 | * | 8/1996 | Umeda et al. ....................... 395/500 |
| 5,787,246 | * | 7/1998 | Lichtman et al. ................. 395/200.5 |
| 5,790,778 | * | 8/1998 | Bush et al. ....................... 395/183.14 |
| 5,892,900 | * | 4/1999 | Ginter et al. ........................ 713/200 |
| 5,963,724 | * | 10/1999 | Mantooth et al. ............... 395/500.44 |
| 5,978,576 | * | 11/1999 | Sanadidi et al. ................. 395/500.43 |
| 6,106,298 | * | 8/2000 | Pollak ..................................... 434/29 |

OTHER PUBLICATIONS

Beizer, "Software Testing Techniques", Van Nostrand Reinhold Publishing, pp. 1–35, 1983.*
IBM Technical Disclosure Bulletin, "Direct Access Storage Device/Small Computer Systems Interface Device Support For OS/2", vol. 37, No. 8, pp. 569–586, Aug. 1994.*
Boris Beizer, "Software Testing Techniques", Van Nostrand Reinhold Company, pp. 1–14, 1983.*
Rosenblum et al., "Complete Computer System Simulation: The SimOS Approach", IEEE, pp. 34–43, 1995.*

* cited by examiner

*Primary Examiner*—Tariq R. Hafiz
*Assistant Examiner*—Ted T. Vo
(74) *Attorney, Agent, or Firm*—Gates & Cooper

(57) ABSTRACT

An apparatus, method, and article of manufacture for testing configuration files stored on a computer. A development environment, executed by the computer, simulates execution of the configuration files to determine one or more modifications made thereby without making the modifications to the computer.

27 Claims, 4 Drawing Sheets

INF DEVELOPMENT ENVIRONMENT

BACKGROUND OF THE INVENTION

1. Field of the Invention

The present invention generally relates to a development environment for creating INF files and, in particular, to a development environment for developing, testing, and debugging portions of INF file without affecting the operation of the computer.

2. Description of the Related Art

An INF file is a configuration file for devices or applications that operate under the control of the Windows 95™ or Windows NT™ operating systems sold by Microsoft Corporation. The INF file is comprised of INF language statements and commands that are interpreted by the operating system (or components thereof) during installation and/or execution. The operating system also provides an application programming interface (API) comprised of a plurality of functions that are used to read and interpret INF files.

More information on INF files can be found in the Win32 Software Development Kit (SDK) for Windows 95™ and Windows NT™ published by Microsoft Corporation. Additional information on INF files can be found in the Windows 95™ or Windows NT™ Device Development Kit (DDK) published by Microsoft Corporation. The Windows™ SDK is a software package that assists programmers in developing software that executes under Microsoft Windows™, and the Windows™ DDK is a software package that assists vendors in writing device drivers for printers, video display cards, and networks for Microsoft Windows™.

The purpose of the INF file is to provide vendors (and customers) with an easy and fairly foolproof method of installing applications and device drivers. Vendors generally create their own custom INF files that are shipped and installed with the device driver or application.

The INF files contain the information required by the operating system to correctly install, access, and/or execute the device driver or application. This information includes, at a minimum, characteristics of the device driver or application, such as version, manufacturer, detect, install, miscellaneous control and strings.

Whenever an INF file is interpreted, the operating system usually copies the software and any other necessary files to the computer, and makes the indicated modifications to the Windows™ Registry. Thereafter, under current Windows™ procedures, the computer is rebooted so that the modifications take effect.

The difficulties that come about when developing INF files include:

1. Debug output from the INF file typically requires two computers, e.g., a target computer coupled to a host computer, with the developer using a debugger on the host computer to communicate with the target computer.

2. Every time the INF file is interpreted, a reboot of the computer is required, which is time consuming.

3. To rerun the INF file, the changes made to the Registry by the previous interpretation of the INF file have to be undone. This implies re-running the INF file using a "remove" option, which requires another reboot of the computer, and then assumes that the remove portion of the INF file is correct and has no programming errors. If the remove option does not work correctly, then the developer must manually remove changes made to the Registry during the interpretation of the INF file.

4. The debug output from the INF file may not show all of the changes made to the operating system and the computer by the interpretation of the INF file. This is especially true for changes made by routines in System INF files provided with the operating system that are invoked by the test INF file.

Thus, such prior art methods of developing and debugging INF files are cumbersome and unwieldy. These prior art methods generally require a substantial amount of time to debug INF files, thereby slowing the actual release of the device or application by the developer. Thus, there is a need in the art for an INF development environment that eliminates these problems and facilitates the creation and debugging of INF files.

SUMMARY OF THE INVENTION

To address the requirements described above, the present invention discloses an apparatus, method, and article of manufacture for testing configuration files stored on a computer. A development environment, executed by the computer, simulates execution of the configuration files to determine one or more modifications made thereby without making the modifications to the computer.

It is an object of the present invention to provide an improved method for testing and debugging INF files by allowing a user to selectively execute specific portions of an INF file comprised of lines of commands. It is a further object that the testing and debugging of the INF file not interfere with the normal operations of the computer.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
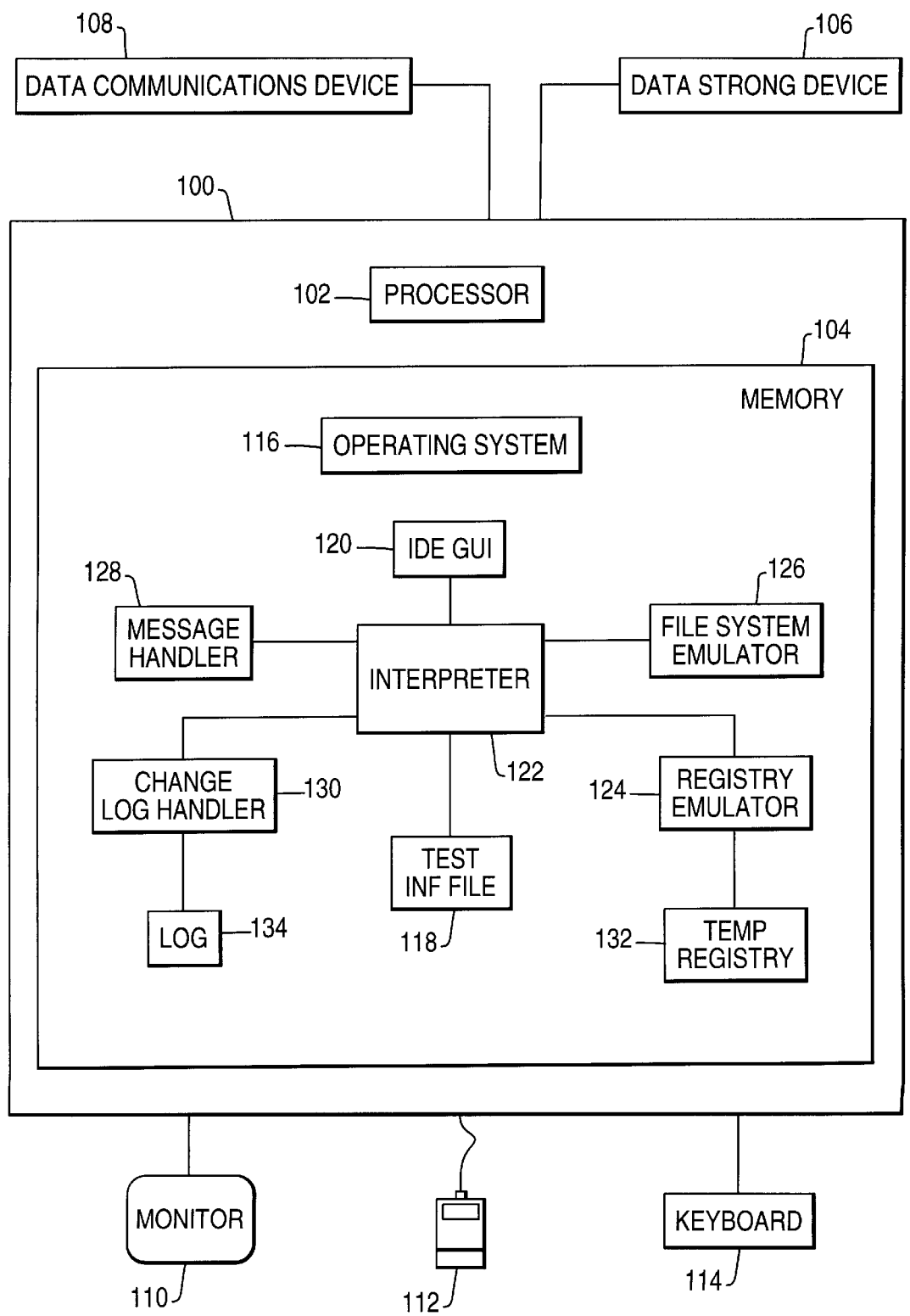
FIG. 1 is an exemplary hardware environment used to implement a preferred embodiment of the present invention.

FIG. 1 is an exemplary hardware environment used to implement a preferred embodiment of the present invention. The present invention is typically implemented using a computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse input devices 112 and keyboard 114. It is envisioned that attached to the computer 100 may be other devices such as read only memory (ROM), a video card, bus interface, printers, etc. In further embodiments, a remote device, such as a server computer, communicates with the computer 100 via the data communications device 108 across a network (e.g., LANs, WANs, Internet, etc.). Those skilled in the art will recognize that any combination of the above components, or any number of different components, peripherals, and other devices, may be used with the computer 100.

The computer 100 usually operates under the control of an operating system 116, which in the preferred embodiment comprises the Windows 95™ or Windows NT™ operating systems 116. The present invention is usually implemented by one or more computer programs accessing one or more data structures, wherein the computer programs operate under the control of the operating system 116, as described in more detail below. However, it should be understood that, in the alternative, the principles of the invention may also apply to specific utilities or functions within the operating system 116 itself. In general, the functions performed in the present invention, whether implemented as part of an operating system 116 or a specific computer program, will be referred to herein as "computer programs."

Generally, the computer programs which implement the preferred embodiment of the invention are embodied in or readable from a computer-readable medium, device, or carrier, e.g., the data storage data device 106 and/or a remote device coupled to the computer 100 via the data communications device 108. Under control of operating system 116, the computer programs may be loaded from the medium, device, or carrier into the memory 104 of the computer 100. The computer programs comprise instructions and/or data which, when read, executed, and/or interpreted by computer 100, cause the computer 100 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

INF Development Environment (IDE)

According to the present invention, the key concept of the IDE system is the ability to execute test INF files 118 in a test environment to determine their would-be actions, while not affecting the current state of the operating system 116 or the computer 100 itself. More specifically, the IDE system of the present invention provides a mechanism for insulating the operating system 116 and the computer 100 from the actions performed when interpreting the test INF file 118 while providing developers with the ability to determine whether or not the INF file 118 is programmed correctly. The IDE system of the present invention solves the problems normally associated with the development of INF files by interpreting the test INF file 118 as if it were being interpreted for an actual installation, and then simulates the changes made by the test INF file 118 without actually making changes to the operating system 116 or the computer 100, while logging all of the changes made by the test INF file 118 so the developer can tell exactly what it is doing.

The key benefits are that developers can (1) avoid corrupting the operating system 116 and computer 100 with an immature INF file 118, (2) avoid manually undoing the actions performed during the interpretation of the INF file 118, and (3) avoid multiple reboots made necessary during the debugging of the INF file 118. Also, the present invention eliminates the need for two computers 100 for debugging purposes.

In the preferred embodiment, the IDE system is comprised of six primary components:

1. IDE Graphical User Interface (IGUI) 120—This component comprises the user interface for controlling the IDE system. Aside from handling information received from the developer for correct emulation of the operating system 116 in interpreting the test INF file 118, the IGUI 120 also handles some critical initialization steps, such as the initialization of system variables.

2. Interpreter 122—This component parses the test INF file 118 and simulates actions taken by the operating system 116 in response to the contents of the test NF file 118. If calls are made to System INF files, then that System INF file is read by he Interpreter 122 and the appropriate functions are performed. The Interpreter 122 also as the capability to simulate built-in functions defined for the INF language, as well as other operating system 116 functions. Any actions taken by the Interpreter 122 are transmitted to a Registry Emulator 124, a File System Emulator 126, a Message Handler 128, and/or a Change Log Handler 130.

3. Registry Emulator 124—This component creates a temporary Registry 132 by coping the actual Registry of the Windows™ operating system 116, accepts changes received from the Interpreter 122, makes those changes to the temporary Registry 132, and logs the changes to the Change Log Handler 130. In this way, the developer can peruse the temporary Registry 132, as well as the log 134 maintained by the Change Log Handler 130, to see how the test INF file 118 would affect the operating system 116 and the computer 100 when installed.

4. File System Emulator 126—This component accepts changes from the Interpreter 122, validates the ability to make the requested changes to the current version of the File System Emulator 126, generates error messages if necessary, and sends would-be changes to the Change Log Handler 130 for logging.

5. Change Log Handler 130—This component accepts input from the Interpreter 122, Registry Emulator 124 and File System Emulator 126, formats the data, and stores it in a test run log 134 for the current test INF file 118.

6. Message Handler 128—This component accepts Debug-Output messages that are generated by the Interpreter 122. The Debug-Output command is a built-in command of the INF language that allows developers to insert a print statement into the test INF file 118 for use in debugging. The Message Handler 128 determines the output location based on options set in the IGUI 120 for local or remote printing or storing, and directs the messages to that location.

Logic of the IDE Components

Figure 2:
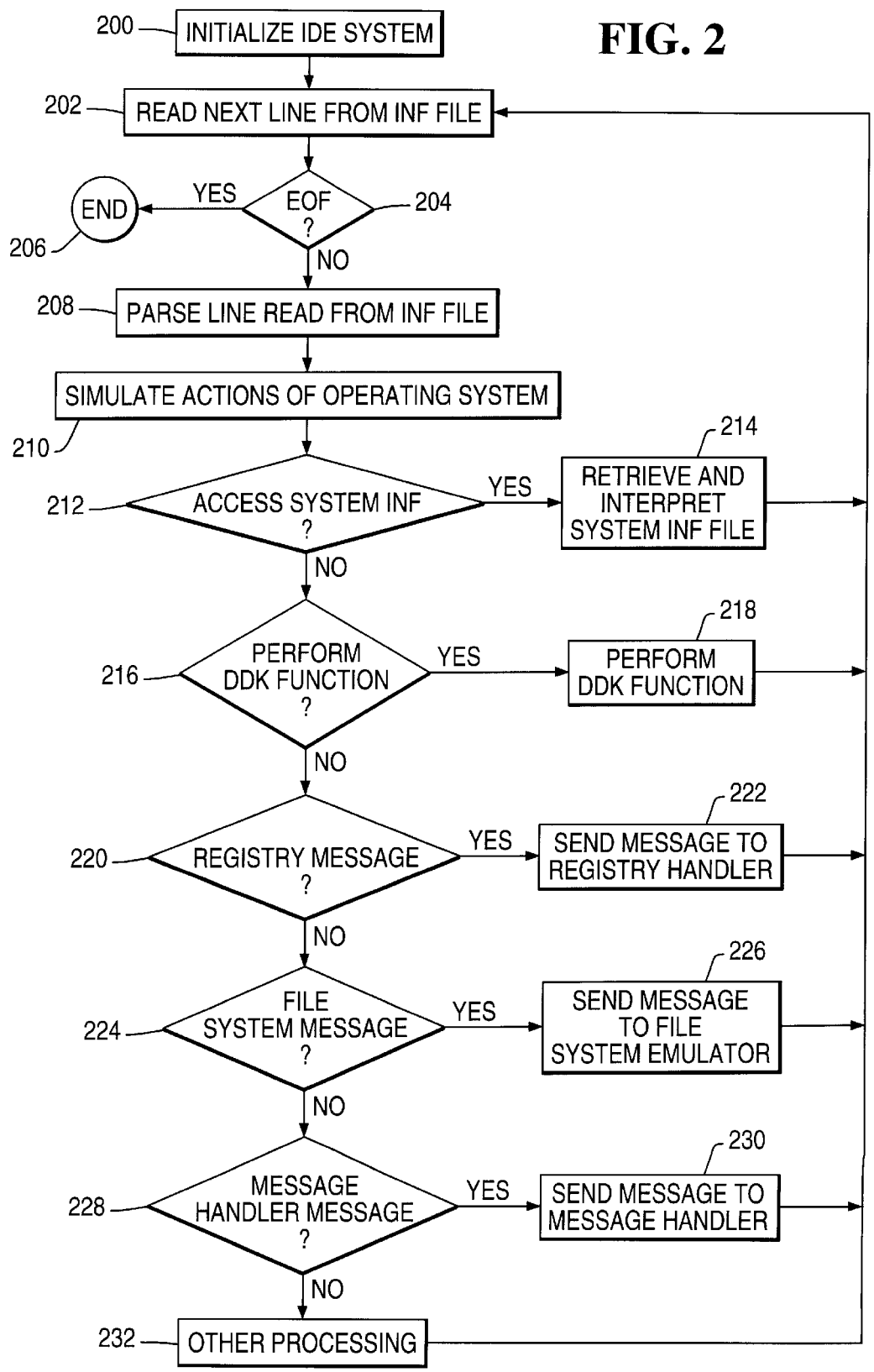
FIG. 2 is a flowchart which illustrates the logic of the IGUI 120 of the IDE system of the present invention.

FIG. 2 is a flowchart which illustrates the logic of the IGUI 120 of the IDE system of the present invention. Those skilled in the art will recognize that this logic is provided for illustrative purposes only and that different logic may be used to accomplish the same results.

Block 200 represents the IDE system initializing, including displaying the IGUI 120 for controlling the IDE system. In Block 200, the IGUI 120 is used by the developer to provide information for the correct emulation of the operating system 116 in interpreting the test INF file 118 and for the initialization of system variables.

Blocks 202–232 represent a loop in the IDE system to read and interpret the contents of the INF file 118. In one embodiment, the IDE system reads and interprets the INF file 118 one line at a time. However, those skilled in the art will recognize that other techniques could also be used. For example, in an alternative embodiment, a multi-pass method could be used to read the entire contents of the INF file 118, determine the dependencies therein, and then execute the contents accordingly.

Block 202 represents the Interpreter 122 reading the next line from the INF file 118. Block 204 is a decision block that represents whether an End-Of-File (EOF) occurred. If so, control transfers to Block 206, which terminates the logic.

Block 208 represents the Interpreter 122 parsing the line read from the INF file 118. Block 210 represents the Interpreter 122 simulating actions taken by the operating system 116 in response to the contents of the parsed line from the INF file 118.

Block 212 is a decision block the represents the Interpreter 122 determining whether a System INF file should be interpreted in response to the line read from the test INF file 118. If so, control transfers to Block 214, which represents the Interpreter 122 reading System INF file and performing the appropriate functions.

Block 216 is a decision block the represents the Interpreter 122 determining whether a DDK built-in function should be performed in response to the line read from the test INF file 118. If so, control transfers to Block 218, which represents the Interpreter 122 performing the appropriate built-in functions.

Block 220 is a decision block the represents the Interpreter 122 determining whether a message should be transmitted to the Registry Emulator 124 in response to the line read from the test INF file 118. If so, control transfers to Block 222, which represents the Interpreter 122 transmitting an appropriate message to the Registry Emulator 124.

Block 224 is a decision block the represents the Interpreter 122 determining whether a message should be transmitted to the File System Emulator 126 in response to the line read from the test INF file 118. If so, control transfers to Block 226, which represents the Interpreter 122 transmitting an appropriate message to the File System Emulator 126.

Block 228 is a decision block the represents the Interpreter 122 determining whether a message should be transmitted to the Message Handler 128 in response to the line read from the INF file 118 (i.e., the line comprises a Debug-Output command). If so, control transfers to Block 230, which represents the Interpreter 122 transmitting an appropriate message to the Message Handler.

Block 232 transfers control back to Block 202.

Figure 3:
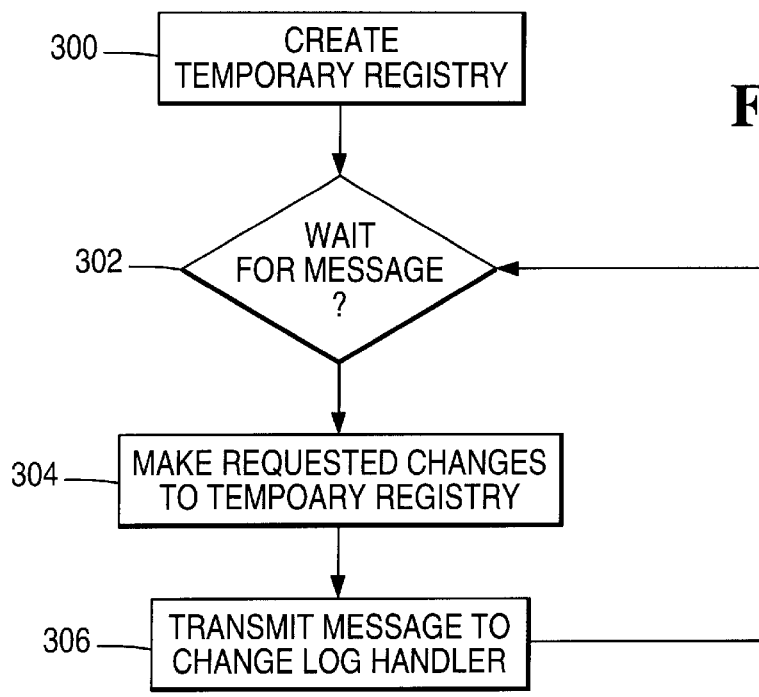
FIG. 3 is a flowchart which illustrates the logic of the Registry Emulator 124 of the IDE system of the present invention.

FIG. 3 is a flowchart which illustrates the logic of the Registry Emulator 124 of the IDE system of the present invention. Those skilled in the art will recognize that this logic is provided for illustrative purposes only and that different logic may be used to accomplish the same results.

Block 300 represents the Registry Emulator 124 creating a temporary Registry 132 by copying the actual Registry of the Windows™ operating system 116. Blocks 302–306 represent a loop, which executes indefinitely. Block 302 represents the Registry Emulator 124 receiving a message from the Interpreter 122, wherein the message identifies changes to the temporary Registry 132. Block 304 represents the Registry Emulator 124 making the requested changes to the temporary Registry 132. Block 306 represents the Registry Emulator 124 transmitting a message identifying the changes to the Change Log Handler 130. Thereafter, control transfers back to Block 302 to wait for the next message.

Figure 4:
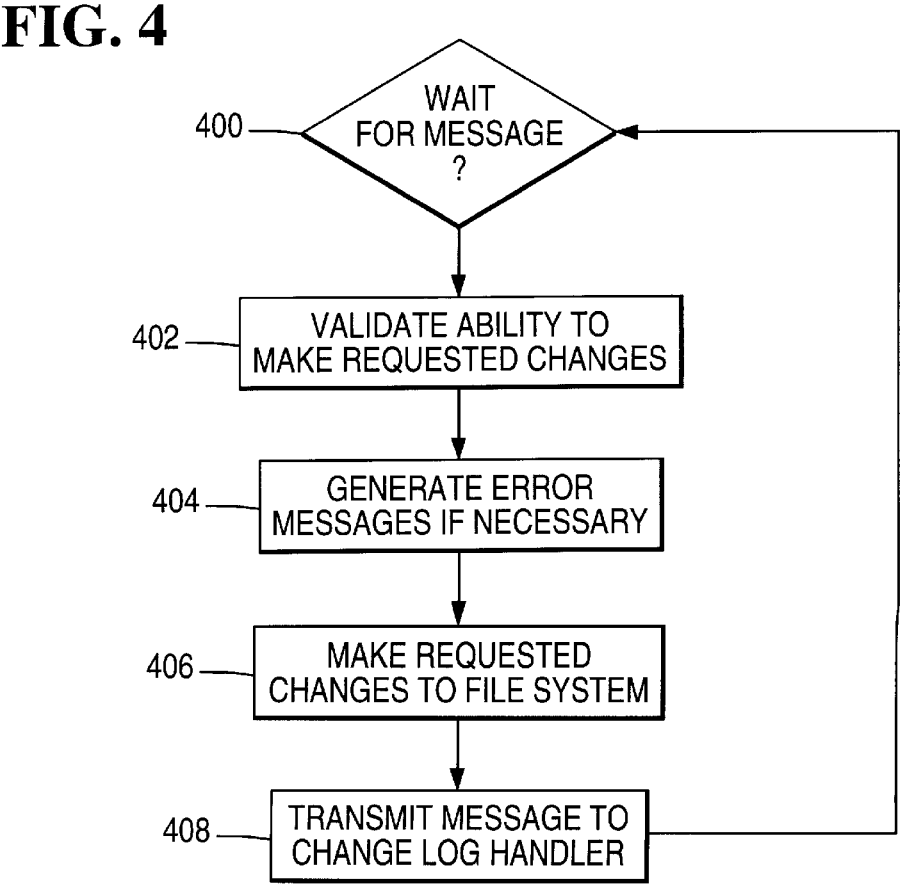
FIG. 4 is a flowchart which illustrates the logic of the File System Emulator 126 of the IDE system of the present invention.

FIG. 4 is a flowchart which illustrates the logic of the File System Emulator 126 of the IDE system of the present invention. Those skilled in the art will recognize that this logic is provided for illustrative purposes only and that different logic may be used to accomplish the same results.

Blocks 400–408 represent a loop, which executes indefinitely. Block 400 represents the File System Emulator 126 receiving a message from the Interpreter 122, wherein the message identifies changes to the file system. Block 402 represents the File System Emulator 126 validating its ability to make the requested changes to the file system. Block 404 represents the File System Emulator 126 generating error messages if necessary. Block 406 represents the File System Emulator 126 making the requested changes to the file system. Block 408 represents the File System Emulator 126 transmitting a message identifying the changes to the Change Log Handler 130. Thereafter, control transfers back to Block 400.

Figure 5:
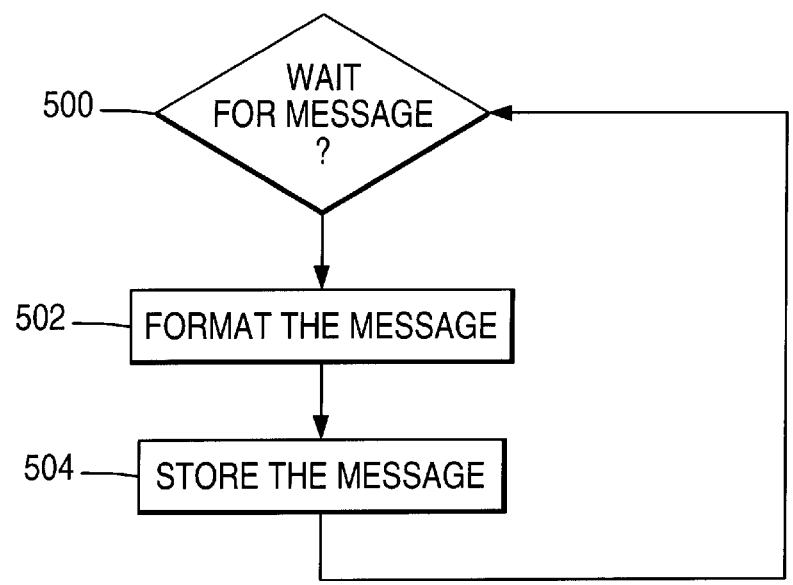
FIG. 5 is a flowchart which illustrates the logic of the Change Log Handler 130 of the IDE system of the present invention.

FIG. 5 is a flowchart which illustrates the logic of the Change Log Handler 130 of the IDE system of the present invention. Those skilled in the art will recognize that this logic is provided for illustrative purposes only and that different logic may be used to accomplish the same results.

Blocks 500–504 represent a loop, which executes indefinitely. Block 500 represents the Change Log Handler 130 receiving a message from one of the other components, wherein the message identifies changes to the temporary Registry 132, file system, or other component. Block 502 represents the Change Log Handler 130 formatting the message. Block 504 represents the Change Log Handler 130 storing the formatted message in a log 134, which may or may not be stored on a data storage device 106. Thereafter, control transfers back to Block 500.

Figure 6:
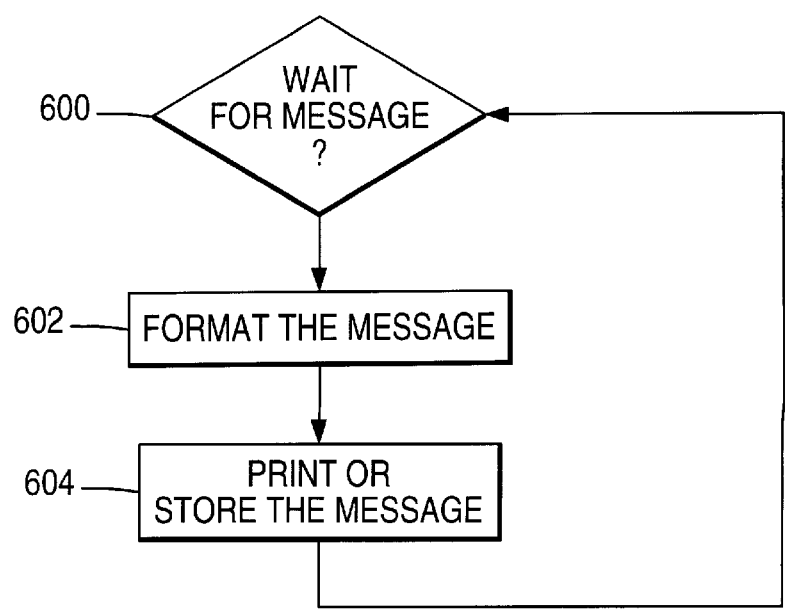
FIG. 6 is a flowchart which illustrates the logic of the Message Handler 128 of the IDE system of the present invention.

FIG. 6 is a flowchart which illustrates the logic of the Message Handler 128 of the IDE system of the present invention. Those skilled in the art will recognize that this logic is provided for illustrative purposes only and that different logic may be used to accomplish the same results.

Blocks 600–602 represent a loop, which is executed indefinitely. Block 600 represents the Message Handler 128 receiving a Debug-Output message from the Interpreter 122, wherein the message includes Debug-Output text from the INF file 118. Block 602 represents the Message Handler 128 formatting the message. Block 604 represents the Message Handler 128 printing the formatted message on a local or remote printer or storing the formatted message in a log on a data storage device 16. Thereafter, control transfers back to Block 600.

Conclusion

This concludes the description of the preferred embodiment of the invention. The following describes some alternative embodiments for accomplishing the present invention.

For example, those skilled in the art will recognize that any type of computer, such as a mainframe, minicomputer, work station or personal computer, could be used with the present invention.

In addition, those skilled in the art will recognize that the present invention is applicable to operating systems other than Windows 95™ and Windows NT™. Indeed, any system that uses configuration files could benefit from the present invention.

Those skilled in the art will recognize that additional functions may also be implemented using the IDE system. For instance, the IDE system discussed above may include an editor or other development components.

In summary, the present invention discloses an apparatus, method, and article of manufacture for testing configuration files stored on a computer. A development environment, executed by the computer, simulates execution of the configuration files to determine one or more modifications made thereby without making the modifications to the computer.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented apparatus for testing effects of a configuration file on an operating system executed by a computer and the computer itself, comprising:

a development environment, executed by the computer under the control of the operating system, for simulating execution of the configuration file to test at least one modification made thereby without actually making the modifications to the operating system and the computer, so that the computer and the operating system are insulated from changes resulting from the modifications;

wherein the development environment further comprises an Interpreter that parses the configuration file and simulates actions taken by the operating system in response to commands in the configuration file;

wherein actions taken by the Interpreter are transmitted to one or more components selected from a group comprising a Registry Emulator, a File System Emulator, a Message Handler, and a Change Log Handler; and wherein the Registry Emulator creates a temporary Registry by copying an actual Registry of the operating system, accepts changes received from the Interpreter, makes those changes to the temporary Registry, and logs the changes to the Change Log Handler, so that a developer can peruse the temporary Registry, as well as a log maintained by the Change Log Handler, to see how the configuration file would affect the operating system and the computer when installed.

2. The apparatus of claim 1 above, wherein the development environment further comprises: a Graphical User Interface (GUI) for handling information received from a developer for correct emulation of the operating system in interpreting the configuration file.

3. The apparatus of claim 1 above, wherein the development environment further comprises: a Graphical User Interface (GUI) for initializing system variables.

4. The apparatus of claim 1 above, wherein the Interpreter simulates built-in functions defined for the configuration file.

5. The apparatus of claim 1 above, wherein the File System Emulator accepts changes from the Interpreter, validates its ability to make the changes to a current version of the File System Emulator, generates error messages if necessary, and logs the changes to the Change Log Handler.

6. The apparatus of claim 1 above, wherein the Change Log Handler accepts input from the Interpreter, Registry Emulator and File System Emulator, formats the input, and stores the formatted input in a log file associated with the configuration file.

7. The apparatus of claim 1 above, wherein the Message Handler accepts Debug-Output messages that are generated by the Interpreter.

8. The apparatus of claim 7 above, wherein the Debug-Output message is a built-in command of the configuration file that allows a developer to print from the configuration file for use in debugging.

9. The apparatus of claim 8 above, wherein the Message Handler determines an output location for printing.

10. A computer-implemented method for testing effects of a configuration file on an operating system executed by a computer and the computer itself, comprising:

simulating execution of the configuration file in a development environment executed by the computer under the control of the operating system, in order to test at least one modification made thereby without actually making the modifications to the operating system and the computer, so that the computer and the operating system are insulated from changes resulting from the modifications;

wherein the development environment further comprises an Interpreter that parses the configuration file and simulates actions taken by the operating system in response to commands in the configuration file;

wherein actions taken by the Interpreter are transmitted to one or more components selected from a group comprising a Registry Emulator, a File System Emulator, a Message Handler, and a Change Log Handler; and wherein the Registry Emulator creates a temporary Registry by copying an actual Registry of the operating system, accepts changes received from the Interpreter, makes those changes to the temporary Registry, and logs the changes to the Change Log Handler, so that a developer can peruse the temporary Registry, as well as a log maintained by the Change Log Handler, to see how the configuration file would affect the operating system and the computer when installed.

11. The method of claim 10 above, wherein the development environment further comprises: a Graphical User Interface (GUI) for handling information received from a developer for correct emulation of the operating system in interpreting the configuration file.

12. The method of claim 10 above, wherein the development environment further comprises: a Graphical User Interface (GUI) for initializing system variables.

13. The method of claim 10 above, wherein the Interpreter simulates built-in functions defined for the configuration file.

14. The method of claim 10 above, wherein the File System Emulator accepts changes from the Interpreter, validates its ability to make the changes to a current version of the File System Emulator, generates error messages if necessary, and logs the changes to the Change Log Handler.

15. The method of claim 10 above, wherein the Change Log Handler accepts input from the Interpreter, Registry Emulator and File System Emulator, formats the input, and stores the formatted input in a log file associated with the configuration file.

16. The method of claim 10 above, wherein the Message Handler accepts Debug-Output messages that are generated by the Interpreter.

17. The method of claim 16 above, wherein the Debug-Output message is a built-in command of the configuration file that allows a developer to print from the configuration file for use in debugging.

18. The method of claim 17 above, wherein the Message Handler determines an output location for printing.

19. An article of manufacture embodying one or more instructions that when executed by a computer cause the computer to perform method steps for testing effects of a configuration file on an operating system executed by a computer and the computer itself, the method comprising:

simulating execution of the configuration file in a development environment executed by the computer under the control of the operating system, in order to test at least one modification made thereby without actually making the modifications to the operating system and the computer, so that the computer and the operating system are insulated from changes resulting from the modifications;

wherein the development environment further comprises an Interpreter that parses the configuration file and simulates actions taken by the operating system in response to commands in the configuration file;

wherein actions taken by the Interpreter are transmitted to one or more components selected from a group comprising a Registry Emulator, a File System Emulator, a Message Handler, and a Change Log Handler; and wherein the Registry Emulator creates a temporary Registry by copying an actual Registry of the operating system, accepts changes received from the Interpreter, makes those changes to the temporary Registry, and logs the changes to the Change Log Handler, so that a developer can peruse the temporary Registry, as well as a log maintained by the Change Log Handler, to see how the configuration file would affect the operating system and the computer when installed.

20. The method of claim 19 above, wherein the development environment further comprises: a Graphical User Interface (GUI) for handling information received from a developer for correct emulation of the operating system in interpreting the configuration file.

21. The method of claim 19 above, wherein the development environment further comprises: a Graphical User Interface (GUI) for initializing system variables.

22. The method of claim 19 above, wherein the Interpreter simulates built-in functions defined for the configuration file.

23. The method of claim 19 above, wherein the File System Emulator accepts changes from the Interpreter, validates its ability to make the changes to a current version of the File System Emulator, generates error messages if necessary, and logs the changes to the Change Log Handler.

24. The method of claim 19 above, wherein the Change Log Handler accepts input from the Interpreter, Registry Emulator and File System Emulator, formats the input, and stores the formatted input in a log file associated with the configuration file.

25. The method of claim 19 above, wherein the Message Handler accepts Debug-Output messages that are generated by the Interpreter.

26. The method of claim 25 above, wherein the Debug-Output message is a built-in command of the configuration file that allows a developer to print from the configuration file for use in debugging.

27. The method of claim 26 above, wherein the Message Handler determines an output location for printing.

* * * * *